United States Patent [19]

Stauner et al.

[11] 3,992,366

[45] Nov. 16, 1976

[54] PROCESS FOR CROSSLINKING HYDROPHILIC COLLOIDS

[75] Inventors: Thomas Stauner, Marly; Rainer Kitzing, Villars sur Glane, both of Switzerland

[73] Assignee: Ciba-Geigy AG, Basel, Switzerland

[22] Filed: Feb. 27, 1974

[21] Appl. No.: 446,243

[30] Foreign Application Priority Data

Mar. 9, 1973  Switzerland.......................... 3517/73

[52] U.S. Cl................................. 260/117; 96/111; 526/9; 526/11
[51] Int. Cl.².................... C08F 116/06; C09H 7/00
[58] Field of Search.................... 260/117, 91.3 VA; 96/111

[56] References Cited
UNITED STATES PATENTS 3,826,788   7/1974   Froehlich et al................. 260/117 X

*Primary Examiner*—Howard E. Schain
*Attorney, Agent, or Firm*—Joseph G. Kolodny; Edward McC. Roberts; Prabodh I. Almaula

[57] ABSTRACT

A process for crosslinking hydrophilic colloids which contain amino, imino and/or hydroxyl groups is provided. The crosslinking agents correspond to the formula

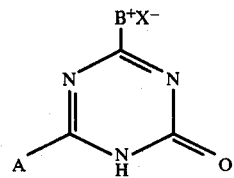

wherein A is hydrogen, hydroxyl, halogen, acylamino, an immonium-ether radical, the radical $-NR_1R_2$ with $R_1$ and $R_2$ being hydrogen, alkyl, alkenyl, alkinyl, cycloalkyl, aryl, aralkyl or the nitrogen atom is part of a saturated ring which optionally contains further hetero-atoms, or the radical $^+NR_3R_4R_5$ with $R_3$, $R_4$ and $R_5$ being hydrogen, alkyl, alkenyl, alkinyl, cycloalkyl, aryl, aralkyl or the nitrogen atom is part of a saturated or unsaturated ring which optionally contains further hetero-atoms, B is an ammonium or phosphonium radical and $X^-$ is an anion. The process is useful for crosslinking e.g. gelatine layers in photographic materials.

26 Claims, No Drawings

PROCESS FOR CROSSLINKING HYDROPHILIC COLLOIDS

The present invention relates to a process for crosslinking hydrophilic colloids by means of onium-s-triazine compounds.

In the literature, there are already disclosed crosslinking agents for hydrophilic colloids which contain, as removable groups which confer solubility in water, onium groups which are bonded to a carbon atom of an aliphatic chain (for example German Offenlegungsschrift No. 1,547,750) or are bonded to the s-triazine ring (German Offenlegungschrift No. 2,215,720).

Hydroxytriazines, which however do not contain any quaternised groups, are also known as gelatine hardeners, from German Auslegeschrift No. 1,284,290.

The present invention now relates to a process for crosslinking hydrophilic colloids which contain amino, imino and/or hydroxyl groups, characterised in that the crosslinking agents are compounds of the formula

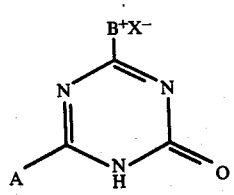

wherein A is hydrogen, hydroxyl, halogen, acylamino, an immonium-ether radical, the radical of the formula

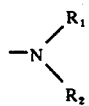

wherein $R_1$ and $R_2$ independently of one another are hydrogen, optionally substituted alkyl, alkenyl, alkinyl, cycloalkyl with 5 or 6 carbon atoms, aryl or aralkyl or together with the nitrogen atom to which they are bonded form a saturated ring which optionally contains yet other hetero-atoms, or the radical of the formula

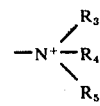

wherein $R_3$, $R_4$ and $R_5$ independently of one another are hydrogen, optionally substituted alkyl, alkenyl, alkinyl, cycloalkyl, aryl or aralkyl or together with the nitrogen atom to which they are bonded form a saturated or unsaturated ring which optionally contains yet other hetero-atoms, $B^+$ is an ammonium or phosphonium radical and $X^-$ is an anion.

The crosslinking agent of the formula (1) can be in the following tautomeric forms:

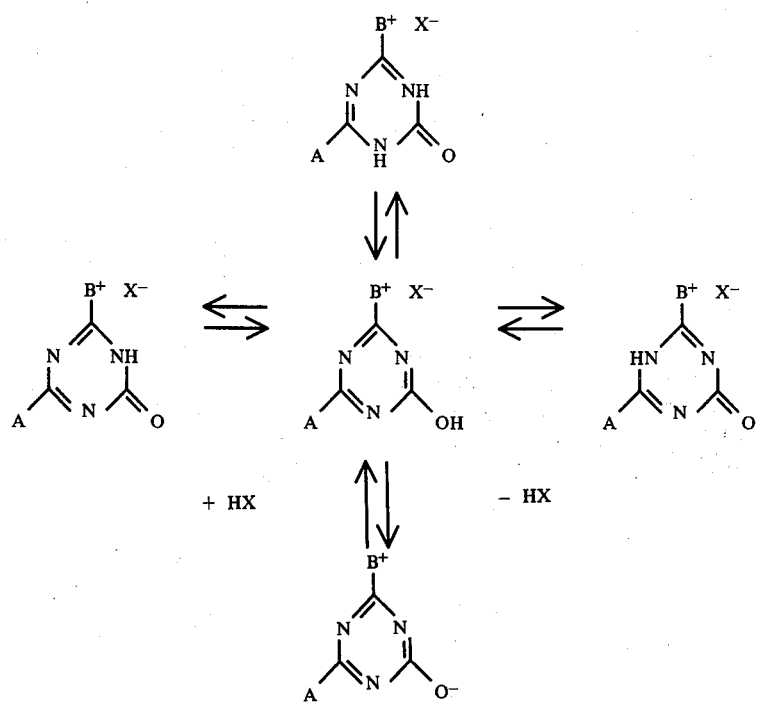

The radical A can be hydrogen, hydroxyl or halogen such as, for example, fluorine, chlorine, bromine or iodine; also, acylamino, such as, for example, acylamino in which the acyl radicals are those of formic, acetic, propionic, butyric or benzoic acid; an immonium-ether radical, such as, for example, the immonium-ether radical of N-methylpyrrolidone; or the radical of the formula

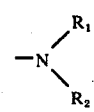

wherein $R_1$ and $R_2$ independently of one another are hydrogen, alkyl such as methyl, ethyl, propyl, butyl, amyl, hexyl, octyl, decyl or dodecyl; substituted alkyl, examples, of possible substituents being the following: —NH$_2$, —N(lower alkyl)$_2$, —N(aryl)$_2$, —NH(alkyl), —NH(aryl), —NH—NH$_2$, —OH, —OCF$_3$, —O-alkyl, —O-aryl, —O—CO— lower alkyl, —O—CO—phenyl which is optionally substituted at the phenyl nucleus, —S—(lower alkyl), —S-phenyl, optionally substituted at the phenyl nucleus, —SCF$_3$, —S—CH$_3$, -alkyl, such as, for example, methyl, ethyl, propyl, isopropyl, butyl, or tert. butyl, -aryl, —Si(alkyl)$_3$—OC$_6$H$_5$, —NHCO-alkyl, —NH—CO-aryl, such as, for example, —NH-COC$_6$H$_5$, —F, —Cl, —Br, —I, —COO$^-$, —CHO, —COOH, —CH$_2$Cl, —B(OH)$_2$, —COC$_6$H$_5$, —CO-alkyl, —CO-aryl, —COO-alkyl, —COO-aryl, —CF$_3$, —SO-alkyl, —SO-aryl, —CN, —SCN, —SO$_2$-alkyl, —SO$_2$-aryl, —NO$_2$, —N(alkyl)$^+_3$, —CONH$_2$, —CON(alkyl)$_2$, —CO—N(aryl)$_2$, —SO$_2$NH$_2$, —SO$_2$—N(alkyl)$_2$, —SO$_2$—N-(aryl)$_2$, —CO—CF$_3$, —NHCOCF$_3$ and —N$_3$; alkenyl and alkinyl such as, for example, propenyl (CH$_2$=CH—CH$_2$—) or propinyl (CH≡C—Ch$_2$—), these radicals optionally also containing substituents such as, for example, those mentioned for alkyl; cycloalkyl, such as cyclohexyl or cyclopentyl, optionally substituted alkyl with 1 to 5 carbon atoms; aryl, such as phenyl or naphthyl, optionally substituted by halogen atoms, such as fluorine, chlorine, bromine, iodine, alkyl and alkoxy with 1 to 5 carbon atoms, nitro, amino or carboxyl and functional derivatives of the two latter, such as, for example, substituted amino groups or carboxylic acid amide or carboxylic acid ester groups; and aralkyl, such as, for example, benzyl or furfuryl; the radicals R$_1$ and R$_2$ can also, together with the nitrogen atom to which they are bonded, form a saturated ring which contains, for example, 3 to 6 ring atoms, including, optionally, yet further hetero-atoms, such as oxygen, nitrogen or sulphur. Examples which may be mentioned are morpholine, thiomorpholine, piperidine or pyrrolidine. The substituent A can furthermore be an ammonium radical of the formula

wherein R$_3$, R$_4$ and R$_5$ independently of one another are hydrogen, optionally substituted alkyl, alkenyl or alkinyl and the possible substituents are the same as those indicated for R$_1$ and R$_2$; if R$_3$, R$_4$ and R$_5$ are cycloalkyl, aryl or aralkyl, the definitions of these radicals given under R$_1$ and R$_2$ again apply. The radicals R$_3$, R$_4$ and R$_5$ can furthermore form, with the nitrogen atom to which they are bonded, a saturated or unsaturated ring which optionally contains yet other hetero-atoms, such as oxygen, sulphur or nitrogen. As examples there may be mentioned unsubstituted or alkyl-substituted morpholinium, thiomorpholinium, pyrrolidinium, piperidinium and pyridinium radicals, wherein the alkyl substituents contain 1 to 5, preferably 1 to 3, carbon atoms, and also the radical

The radical B$^+$ denotes an ammonium or phosphonium radical, the definition of the ammonium radical for the substituent A also applying to B$^+$.

The radical B$^+$ is preferably an ammonium radical substituted by aliphatic or cycloaliphatic radicals or a monocyclic saturated or unsaturated cycloammonium radical of which the quaternary nitrogen atom belongs to a monocyclic aliphatic or aromatic ring which optionally contains further hetero-atoms. The radical B$^+$ can contain up to three different alkyl, cycloalkyl, alkenyl or alkinyl groups. The alkyl groups contain, for example, 1 to 5, preferably 1 to 3, carbon atoms, possible cycloalkyl groups are, for example, cyclohexyl and cyclopentyl and suitable alkenyl or alkinyl groups are propenyl or propinyl. If B$^+$ is a saturated or unsaturated monocyclic cycloammonium radical, these can be, for example, unsubstituted or alkyl-substituted morpholinium, thiomorpholinium, pyrrolidinium, piperidinium and pyridinium radicals, wherein the alkyl substituents contain 1 to 5, preferably 1 to 3 carbon atoms, and also the radical

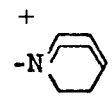

The following substituents B$^+$ may be mentioned individually: 1-Methylpyrrolidinium, 1-methylpiperidinium, 1-methylmorpholinium, 1-ethylmorpholinium, pyridinium,

trimethylammonium, dimethylcyclohexylammonium and dimethylpropinylammonium.

The anion X$^-$ is preferably a colourless acid anion. Where the crosslinking agents are used to crosslink hydrophilic colloids in photographic emulsions, these anions should, of course, preferably be photographically inert, that is to say they should not affect the solubility of the silver salts through precipitation or complex formation and equally they should not influence the sensitivity and the gradation.

Suitable crosslinking agents which can be used according to the invention are, in particular, compounds of the formula

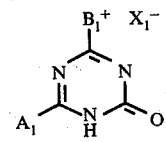

wherein $A_1$ is hydroxyl, halogen, the radical of the formula

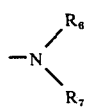

wherein $R_6$ and $R_7$ independently of one another are hydrogen and at least one of the substituents $R_6$ and $R_7$ is alkyl, alkenyl, alkinyl, hydroxyalkyl or alkoxyalkyl with 1 to 5 carbon atoms, cycloalkyl with 5 or 6 carbon atoms, phenyl, phenyl substituted by hydroxyl, halogen or alkoxy, or furfuryl, or $R_6$ and $R_7$ together with the nitrogen atom to which they are bonded represent a saturated 5-membered or 6-membered ring which optionally contains yet further hetero-atoms, or $A_1$ is the radical of the formula

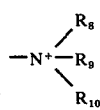

wherein $R_8$, $R_9$ and $R_{10}$ independently of one another are alkyl, alkenyl, alkinyl with up to 5 carbon atoms or cycloalkyl with 5 or 6 carbon atoms or at least two of the substituents, together with the nitrogen atom to which they are bonded, represent a saturated or unsaturated 5-membered or 6-membered ring which optionally contains yet further hetero-atoms, $X_1^-$ is a halogen, nitrate, sulphate, phosphate, carbonate, borate, chlorate, iodate, perchlorate, thiocyanate, methylsulphate, ethylsulphate, acetate, trifluoroacetate, oxalate, tartrate, benzoate, benzenesulphonate, p-toluenesulphonate, tetrafluoroborate, hexafluorophosphate, hexafluorotitanate, hexafluoroantimonate, hexafluoroarsenate, hexachlorostannate, hexachloroantimonate, tetrachloroaurate tetrachloroaluminate and tetrachloroferrate anion and $B_1^+$ is an ammonium radical containing up to three different alkyl, cycloalkyl, alkenyl or alkinyl groups or a monocyclic saturated or unsaturated cycloammonium radical bonded to the heterocyclic radical via a quaternary ring nitrogen atom.

Particularly preferred anions $X_1^-$ are chloride, iodide, perchlorate, tetrafluoroborate, hexafluoroarsenate and hexafluorophosphate.

Further compounds of particular interest are those of the formula

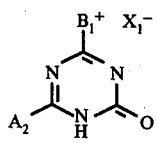

(III)

wherein $A_2$ is hydroxyl, halogen, the radical of the formula

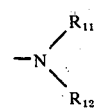

wherein $R_{11}$ and $R_{12}$ independently of one another are hydrogen and at least one of the substituents $R_{11}$ and $R_{12}$ is alkyl, alkenyl, alkinyl, hydroxyalkyl or alkoxyalkyl with up to 3 carbon atoms, cyclohexyl, phenyl or furfuryl or $R_{11}$ and $R_{12}$ together with the nitrogen atom to which they are bonded represent a saturated 5-membered or 6-membered ring which optionally contains oxygen or sulphur atoms or further nitrogen atoms, or $A_2$ is the radical of the formula

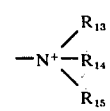

wherein $R_{13}$, $R_{14}$ and $R_{15}$ independently of one-another are alkyl, alkenyl, alkinyl with up to 3 carbon atoms or cyclohexyl or two of the substituents together with the nitrogen atom to which they are bonded represent a saturated or unsaturated 5-membered or 6-membered ring which optionally contains oxygen or sulphur atoms or further nitrogen atoms and $B_1^+$ and $X_1^-$ have the indicated meaning, as well as compounds of the formula

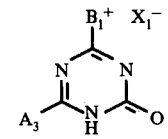

(IV)

wherein $A_3$ is hydroxyl, chlorine, amino, a monosubstituted or disubstituted alkylamino, alkenylamino, hydroxyalkylamino or alkoxyalkylamino radical, each with up to 3 carbon atoms, a morpholine, piperidine, pyrrolidine or furfurylamino radical, or trialkylammonium, dialkylcyclohexylammonium or dialkylpropinylammonium radical with 1 to 3 carbon atoms per alkyl radical, an alkylmorpholinium, alkylpyrrolidinium or alkylpiperidinium radical with 1 to 3 carbon atoms in the alkyl radical, the radical

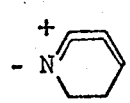

or a pyridinium radical and $B_1^+$ and $X_1^-$ have the indicated meaning.

Particularly preferred substituents $A_3$ are $-NH_2$, $-NHCH_3$, $-NH(CH_2)_2OH$, $(CH_3)_3N^+-$,

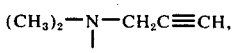

1-methylpyrrolidinium, 1-methylpiperidinium and 1-methylmorpholinium.

Further particularly valuable compounds are the crosslinking agents which correspond to the formula

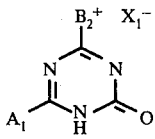 (V)

wherein $A_1$ and $X_1$ have the indicated meaning and $B_2^+$ is an ammonium radical substituted by up to three different alkyl, alkenyl or alkinyl groups with up to 5 carbon atoms or cycloalkyl groups with 5 or 6 carbon atoms, or an ammonium radical of which the quaternary bonding nitrogen atom, which is substituted by an alkyl radical with 1 to 5 carbon atoms, belongs to a 5-membered or 6-membered monocyclic aliphatic ring which optionally contains an oxygen or sulphur atom or further nitrogen atoms, and those of the formula

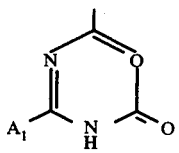 (VI)

wherein $A_1$ and $X_1^-$ have the indicated meaning and $B_3^+$ is a trialkylammonium, dialkylcyclohexylammonium or dialkylpropinylammonium radical with 1 to 3 carbon atoms per alkyl radical, a morpholinium, pyrrolidinium and piperidinium radical or an alkylmorpholinium, alkylpyrrolidinium or alkylpiperidinium radical with 1 to 3 carbon atoms in the alkyl radical, the radical

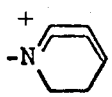

or a pyridinium radical.

Particularly preferred substituents $B_3^+$ are 1-methylpyrrolidinium, 1-methylpiperidinium and 1-methylmorpholinium.

Very particularly preferred compounds are the crosslinking agents of the formulae

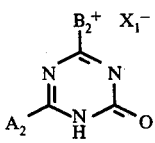 (VII)

and

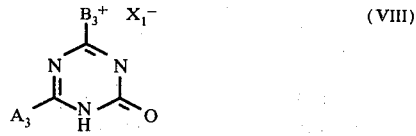 (VIII)

wherein $A_2$, $A_3$, $B_2^+$, $B_3^+$ and $X_1^-$ have the indicated meaning.

The onium compounds to be used according to the invention can be derived, for example, from cyanuric chloride (2,4,6-trichloro-1,3,5-triazine) or from amino-, hydroxy- or acylamino-triazines.

The radicals A and $B_1$ can be derived, for example, from the following starting materials: 1-Amino-adamantane, 2-amino-adamantane, β-alanine, allylamine, allylcyclohexylamine, 2-amino-1-butanol, 6-aminocaproic acid, 3-aminocrotonitrile, 1-amino-3-diethylamino-2-propanol, aminodiphenylmethane, 2-aminoethanethiol, 2-amino-heptane, 6-amino-1-hexanol, aminomethanesulphonic acid, β-methoxyisopropylamine, aminomethylcyclopropane, 2-amino-3-methylpentane, 4-(aminomethyl)-piperidine, 2-amino-2-methyl-1-propanol, 2-amino-norbornane, 5-amino-1-pentanol, 3-aminopropanesulphonic acid, isopropylamine, 5-aminovaleric acid, amylamine, benzylamine, benzylmethylamine, benzylpropargylamine, n-butylamine, sec.-butylamine, tert.-butylamine, chloro-benzylamine, 3-chloropropylamine, cyclododecylamine, cycloheptylamine, cyclohexylamine, cyclooctylamine, cyclopentylamine, cyclopropylamine, n-decylamine, diallylamine, 1,4-diaminobutane, 1,2-diaminocyclohexane, dibenzylamine, di-n-butylamine, dicyclohexylamine, diethylamine, di-n-hexylamine, diisobutylamine, diisopropylamine, dimethylamine, di-n-nonylamine, di-n-octylamine, dipropargylamine, dodecylamine, di-propylamine, ethanolamine, diethanolamine, 2-ethoxy-ethylamine, N-ethyl-benzylamine, N-ethyl-n-butylamine, o-fluoro-benzylamine, furfurylamine, n-heptylamine, 1,6-hexanediamine, iso-amylamine, isobutylamine, isopropylamine, methanediamine, p-methoxy-benzylamine, 2-methoxy-ethylamine, 3-methoxy-propylamine, methylamine, N-methyl-cyclohexylamine, N-methyl-cyclopentylamine, N-methyl-furfurylamine, n-nonylamine, n-octylamine, tert.-octylamine, 3-phenyl-1-propylamine, propylamine, tetrahydrofurfurylamine, ammonia, ethylamine, ethyleneimine, cyclopropylamine, perfluorobutylamine, cyclobutylamine, pyrrolidine, morpholine, thiomorpholine, piperidine, 1-hydroxy-piperidine, aniline, pyridine, 3-diethylaminopropylamine, N,N-diethylcyclohexylamine, diethylmethylamine, N,N-diisopropylethylamine, 1-dimethylamino-2-propanol, N,N-dimethylpropargylamine, dimethylbenzylamine, N,N-dimethylethanolamine, N,N-dimethyl-1-phenylcyclohexylamine, tribenzylamine, tributylamine, triethylamine, tri-n-octylamine, tri-propylamine, N-methyl-piperidine, N-ethyl-piperidine, N-methyl-morpholine, N-ethyl-morpholine, 4-methyl-thiomorpholine, 4-methylthiomorpholine-1,1-dioxide, N-methyl-pyrrolidine, N-ethyl-pyrrolidine, trimethylamine, N-n-butyl-N,N-dimethylamine, N-methyl-N,N-diethylamine, N-cyclohexyl-N,N-dimethylamine, N-ethyl-N,N-dimethylamine, methanol, ethanol, propanol, isopropanol, butanol, sec. butanol, phenol, formamide, acetamide, propionic acid amide, butyric acid amide, benzoic acid amide, benzenesulphonic acid amide, p-methyl-benzenesulphonic acid amide, methanesulphonic acid amide and ethanesulphonic acid amide.

The onium compounds to be used according to the invention can be manufactured, for example, by reacting halogenotriazines, preferably trichlorotriazine, or the halogenotriazine derivatives which have been mentioned, for example 2-amino-4,6-dichlorotriazine, with a basic compound B, especially a tertiary amine. The reaction takes place, for example, at temperatures between 0° and 40° C, and is preferably effected at 0° to 50° C by combining the reactants in the presence of a solvent. The introduction of the OH or =O (tautomeric equilibrium) grouping contained in the compounds can be effected, for example, by hydrolytic splitting of -ether-, -C-halogen or

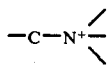

bonds at any stage of the reaction. Thus, it is possible to effect a partial hydrolysis already on the starting material (trichlorotriazine or substituted triazine), or only to effect a hydrolysis at the end of the reaction.

The crosslinking agents used according to the invention can be used in the textile and leather industry, the manufacture of paper and the plastics, glue and gelatine industry. Above all, they are used as hardeners for water-soluble polymers such as polyvinyl alcohol, gelatine or gelatine derivatives, especially in the form of layers of photographic materials which contain such colloids. The reaction of these colloids with these compounds in general takes place easily, and in the usual manner. The compounds are, as a rule, sufficiently water-soluble.

In most cases it suffices to add the products to be used according to the invention, as an aqueous solution or in a solid form which is as finely divided as possible, to an aqueous solution of the hydrophilic colloid, with good stirring.

Thus, for example, a solution of the crosslinking agents in water, or mixed with, for example, ethanol, methanol or acetone, can be brought together with the colloids at normal or slightly raised temperature. Gelatine, which optionally contains silver halide and/or other components required to produce photographic images, has proved particularly suitable for this purpose. The gelatine can, in the usual way, be cast on a substrate to form a layer, and be dried. The layer can then be left at raised temperature or a room temperature for a certain time, for example up to 24 hours. Hereupon, the hardening takes place rapidly and progressively; the melting point of the gelatine is raised substantially, for example by 25° to 60° C, and the reciprocal swelling factor increases correspondingly (compare Table 1).

The amount of the hardener used depends on the desired degree of hardening but is suitably from 0.1 to 10 per cent by weight based on the weight of the dry gelatine.

A particular advantage of the present crosslinking agents is that when used at a low concentration they impart a sufficient degree of hardness to the gelatine layers already after, for example, 18 to 24 hours, so that the cast films can be tested by processing a sample immediately following its manufacture, even if the test is carried out at a raised temperature or in aggressive processing baths.

It is a further advantage that on hardening, according to the invention, with the compounds of the formula (I), no significant change in pH of the emulsion layer occurs.

The hardening effect itself is very stable; even after prolonged storage at temperatures around 40° C and a relative atmospheric humidity of about 70%, the reciprocal swelling factor remains above 0.2 (compare Table 1).

The degree of hardening is also not changed significantly by acids or bases even on prolonged action, which indicates that the hardener-gelatine bond has great resistance to hydrolysis.

The compounds used according to the invention are furthermore generally sufficiently soluble in water and sufficiently stable in aqueous solutions.

The adequate stability and solubility are both particularly important properties on which, for example, the applicability of the compounds in photographic technology depends decisively. Thus, for example, it is particularly desirable — for the continuous manufacture of photographic materials — that batches of solutions of crosslinking agents should remain stable at room temperature for several hours or days and that the concentration of the hardener, and hence its ability to crosslink gelatine, should not decrease or should only do so insignificantly. On the other hand, it is equally important that in the casting solution at about 40° C the hardener should, for the same reason, undergo very little or no decomposition and very little or no reaction with water during the requisite standing time and dwell time, so as to maintain its full crosslinking action over the course of several hours, during casting, drying and storage of the photographic material.

Furthermore, the viscosity of the casting solution should not significantly increase during the standing time as a result of the addition of the hardener. It is also particularly important that even on prolonged treatment of the cast layer at raised temperature and atmospheric humidity the hardener should not cause any yellowing, fogging or effect on the gradation.

The compounds of the general formula (1) in most cases fulfil these strict requirements with respect to their stability to hydrolysis. The requirements are fulfilled in every case if, in aqueous solution at 40° C, the time required for half the compound to decompose is at least 8 hours but preferably at least 12 hours.

The hardeners are suitable for hardening (crosslinking) the most diverse layers containing gelatine such as, for example, intermediate layers, emulsion layers, base layers, top layers, backing layers and anti-halation layers. The layers can contain not only the crosslinking agents but also additives of the most diverse kind such as, for example, silver halide, pigments, such as barium sulphate, titanium dioxide or silicon dioxide or those of organic nature, such as coloured pigments, and also image dyestuffs, colour coupling agents, sensitisers, filter dyestuffs, anti-halation dyestuffs and screening dyestuffs, stabilisers, UV absorbers, optical brighteners or other crosslinking agents.

In the case of the compounds of relatively low molecular weight it is possible, because of their good ability to diffuse in a multi-layer material, to add them only to the auxiliary layers in order to achieve hardening of the adjacent silver halide layers through diffusion. However, with increasing molecular weight comparable compounds show decreasing diffusion when used in photographic layers. In the manufacture of multi-layer materials, this property offers decisive advantages in several respects.

These new crosslinking agents can also be used as mixtures with other compounds suitable for crosslinking water-soluble colloids, especially gelatine. The examples which follow serve to explain the invention without restricting it thereto.

MANUFACTURING INSTRUCTIONS

Example 1 (Compound No. 101)

82.5 g (0.5 mol) of amino-dichloro-triazine are dissolved in 3,000 ml of acetone. 111 ml (1 mol) of N-methylmorpholine are added dropwise over the course of one hour at 0° – 5° C. The mixture is stirred for a further hour without cooling; the precipitate is filtered off, washed with acetone and dried. The product can be recrystallised from water/acetone.

The resulting bis-morpholinium salt is dissolved in 900 ml of water. After standing for 64 hours at room temperature, undissolved matter is filtered off and the solution is evaporated to dryness. The residue is twice extracted with hot acetonitrile in order to remove N-methylmorpholinium chloride.

The product is dissolved in 350 ml of water and precipitated with acetone. The precipitate is filtered off, washed with acetone and dried in vacuo.

80 g of the compound of the formula (101)

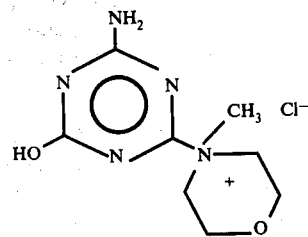

are obtained.

Melting point: Approx. 175° C (decomposition).

Analysis: Calculated: C, 38.79; H, 5.70; N, 28.28; Cl, 14.31. Found: C, 38.56; H, 5.73; N, 28.08; Cl, 14.33.

The compounds (102) to (106) Table 1) can be manufactured according to customary methods by replacement of the chloride anion.

Example 2 (Compound No. 107)

16.5 g. (0.1 mol) of amino-dichloro-triazine are dissolved in 180 ml of absolute acetone. 20 g (0.2 mole) of N-methylpiperidine in 60 ml of absolute acetone are added dropwise thereto at 0° – 5° C. The mixture is then left to react for one hour at 20° C and the bis-ammonium salt which has precipitated is filtered off and washed with a little acetone. The product is dissolved in 150 ml of dimethylformamide: H₂O (2 : 1) at 20° C and the solution is treated with active charcoal and clarified by filtration. A product is obtained in a crystalline form by precipitation with acetone. The crystals are suspended in 250 ml of absolute acetone, filtered off and washed with ether. After drying, the product (di-N-methylpiperidiniumaminotriazine) melts at 126° – 27° C.

13 g of this product are dissolved in 130 ml of distilled water and the solution is kept at 70° C for 7 hours. It is clarified by filtration and evaporated to dryness in vacuo. The residue is suspended in 70 ml of acetonitrile and stirred for 30 minutes at 20° C. The insoluble product is filtered off, washed with a little acetonitrile and recrystallised from water-acetone. After drying in vacuo (24 hours at 50° C), 4.3 g of the compound of the formula (107)

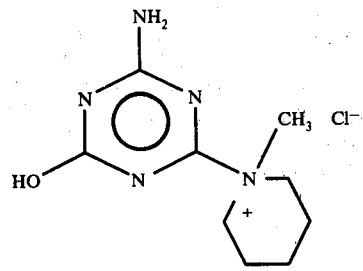

are obtained.

Melting point: 179°– 181° C (decomposition)

Analysis: Calculated: C, 43.99; H, 6.56; N, 28.50; Cl, 14.43. Found: C, 43.99; H, 6.74; N, 28.38; Cl, 14.65.

Example 3 (Compound No. 108)

The same procedure as in Example 2 is followed but instead of N-methylpiperidine an equivalent amount of N-methylpyrrolidine is used. After crystallisation from acetone-water and drying, the analogous intermediate product, having a melting point of 142° to 144° C, is obtained.

12 g of this bis-ammonium salt are dissolved in 120 ml of distilled water and the solution is heated to 70° C for 3½ hours. The precipitate is filtered off. The filtrate is evaporated to dryness in vacuo. The colourless residue is suspended in 100 ml of acetonitrile for 30 minutes, again filtered off and washed with acetonitrile. The residue is reprecipitated from a little water-acetone at 20° C and dried for 24 hours in vacuo at 60° C. 1.5 g of 4-hydroxy-6-aminotriazine-2-pyrrolidinium chloride of melting point 156° to 158° C are obtained.

Analysis: Calculated: Cl, 15.30. Found: Cl, 15.15.

Example 4 (Compound No. 109)

4 g (20 mmols) of 2-hydroxy-4-chloro-6-diethylamino-s-triazine are suspended in 40 ml of acetonitrile and 4 g (40 mmols) of N-methylpiperidine are added at room temperature. The temperature rises to 32° C. The mixture is stirred for a further 3 hours at 20° C. The reaction product is then precipitated as an oil by means of approx. 300 ml of a mixture of ether: ethyl acetate = 2:1. The oil is dissolved in a little methyl ethyl ketone and a solution of 3 g of sodium perchlorate in 30 ml of acetone is added. The mixture is stirred for 10 minutes and the product is precipitated as an oil by means of ethyl acetate. The oil is taken up in a little isopropanol : ethyl acetate = 1 : 2, the solution is cooled to 0° C and 2 – 3 ml of concentrated hydrochloric acid are added. After a short time, the product begins to crystallise. The crystals are filtered off, the product is dissolved in a little warm acetone and an approx. nine-fold amount of ethyl acetate is added. On cooling, the product crystallises. 1.4 g of 4-hydroxy-6-diethyl-aminotriazine-2-N-methylpiperidinium perchlorate are obtained. Melting point: 143°– 145° C (decomposition).

Analysis: Calculated: C, 42.68; H, 6.61; N, 19.14; Cl, 9.69. Found: C, 42.27; H, 6.65; N, 18.80; Cl, 9.44.

Example 5 (Compound No. 110)

23.5 g (0.1 mol) of 2-morpholino-4,6-dichlorotriazine are dissolved in 500 ml of absolute acetone at 30° C. 23.4 ml of N-methylmorpholine, dissolved in 100 ml of acetone, are added dropwise. After a reaction time of one hour, the product is filtered off, washed with acetone and dried.

Yield: 42 g.

This bis-ammonium salt is dissolved in 210 ml of water and the solution is left to stand for 48 hours at room temperature. The water is stripped off in vacuo at 35° C. The residue is treated with hot acetone and then with acetonitrile. 23 g remain undissolved. After dissolving this residue in 60 ml of water and precipitating the product with 1,000 ml of acetone, 14 g of white crystals are left. These are dissolved in 15 ml of water; a solution of 6 g of sodium tetrafluoroborate in 10 ml of water is added thereto. After cooling, the precipitate is filtered off, washed with a little cold water and dried.

Yield: 11.6 g of the compound of the formula

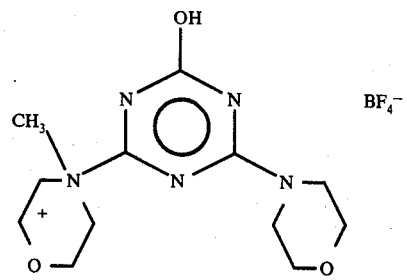
(110)

Melting point: 201° C.

Analysis: Calculated: C, 39.05; H, 5.46; N, 18.97. Found: C, 38.95; H, 5.50; N, 18.96.

Example 6 (Compound No. 111)

15 g (0.0725 mol) of N-isopropylamino-dichlorotriazine are dissolved in 200 ml of absolute acetone. 16 g (0.158 mol) of N-methylmorpholine are added. The precipitate is filtered off, washed with acetone and dissolved in 100 ml of water. The bis-ammonium salt is hydrolysed for 60 hours at 35° C. The water is stripped off and the crystalline residue is extracted with hot acetonitrile.

1.8 g of the compound of the formula

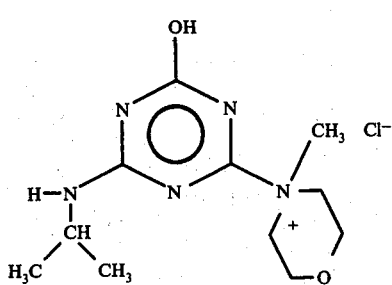
(111)

are obtained.

Melting point: 170° C.

Analysis: $C_{11}H_{20}N_5O_2Cl$ (289.77). Calculated: C, 45.60; H, 6.96; N, 24.17. Found: C, 45.51; H, 7.02; N, 24.07.

Example 7 (Compound No. 112)

24.5 g (0.1 mol) of furfurylamino-dichloro-triazine are dissolved in 245 ml of absolute acetone. 23 ml (0.205 mol) of N-methylmorpholine are added. The precipitate is filtered off and washed with acetone. It is dissolved in 150 ml of water and the solution is kept at room temperature for 60 hours. Undissolved matter is filtered off and the filtrate is evaporated to dryness. The residue is extracted with hot acetonitrile.

5.4 g of the compound of the formula

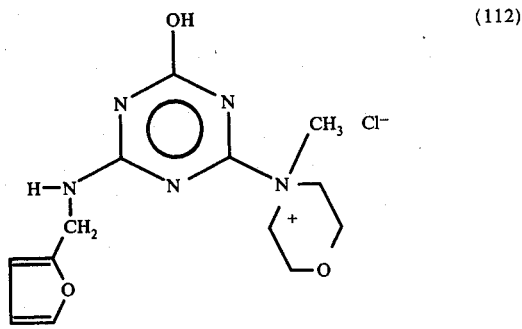
(112)

are obtained.

Melting point: 143° C.

Analysis: $C_{13}H_{18}N_5O_3Cl$ (327.77). Calculated: C, 47.64; H, 5.54; N, 21.37. Found: C, 48.11; H, 5.74; N, 22.50.

Example 8 (Compound No. 113)

15 g (0.073 mol) of N-allylamino-dichloro-triazine are dissolved in 200 ml of acetone. 15.5 g (0.157 mol) of N-methylpiperidine are added. The precipitate is filtered off, washed with acetone and dissolved in 100 ml of $H_2O$. After 4 days at 40° C, the solution is evaporated to dryness. The residue is recrystallised from acetonitrile.

1.9 g of the compound of the formula

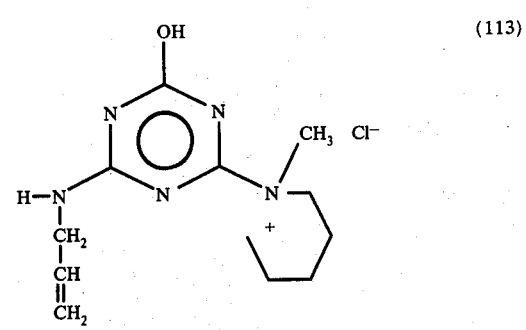
(113)

are obtained.

Melting point: 146°– 147° C.

Analysis: $C_{12}H_{20}N_5OCl$ (285.78). Calculated: C, 50.43; H, 7.05; N, 24.51. Found: C, 50.51; H, 7.07; N, 24.58.

Example 9 (Compound No. 114)

15 g (0.062 mol) of 2,4-dichloro-6-anilino-triazine-1,3,5 are dissolved in 200 ml of absolute acetone. 13.5 g (0.134 mol) of N-methylmorpholine are added thereto. After 30 minutes' reaction time, the precipitate is filtered off and washed with acetone. The product is dissolved in 100 ml of water. After 4 hours, a heavy precipitate forms; this is filtered off, extracted twice with hot acetonitrile and dried.

9.3 g of the compound of the formula

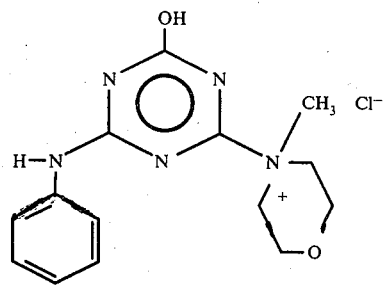
(114)

are obtained.

Melting point: 181° C.

Analysis: $C_{14}H_{18}ClN_5O_2$ (323.78). Calculated: C, 51.93; H, 5.60; N, 21.63. Found: C, 51.81; H, 5.62; N, 21.76.

Example 10 (Compound No. 115)

15 g (0.067 mol) of β-methoxy-ethylamino-dichloro-triazine are dissolved in 200 ml of absolute acetone. 15.4 g (0.153 mol) of N-methylmorpholine are added dropwise. The precipitate is filtered off, washed with acetone and dissolved in 100 ml of $H_2O$. The solution is kept at 30°– 35° C for 20 hours, undissolved matter is filtered off, and the filtrate is evaporated to dryness. The residue is extracted with hot acetonitrile and the undissolved matter is taken up in $H_2O$ and precipitated as the fluoroborate by addition of $NaBF_4$.

1.9 g of the compound of the formula

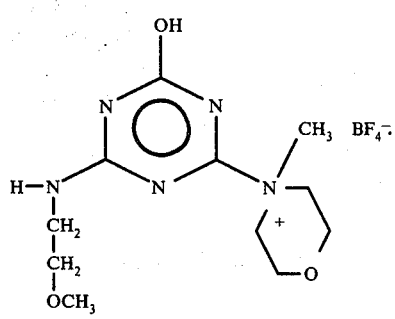
(115)

are obtained.

Melting point: 165° C.

Analysis: $C_{11}H_{20}N_5O_3BF_4 \cdot \frac{1}{2} H_2O$ (366.12). Calculated: C, 36.10; H, 5.74; N, 19.15. Found: C, 36.25; H, 5.61; N, 19.05.

Example 11 (Compound No. 116)

10 g (0.041 mol) of 2,4-dichloro-6-anilino-triazine-1,3,5 are dissolved in 150 ml of absolute acetone. 8.7 g (0.088 mol) of N-methylpiperidine are added, whilst cooling. The precipitate is filtered off, washed with acetone and dissolved in 100 ml of $H_2O$. A precipitate forms within 20 hours. This is filtered off, washed with hot acetone and recrystallised from acetonitrile. The product is hygroscopic.

0.4 g of the compound of the formula

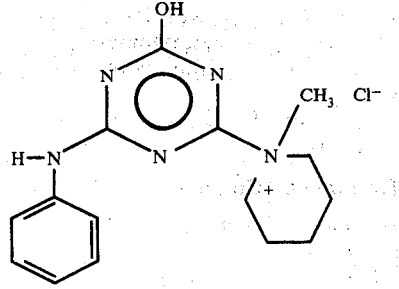
(116)

is obtained.

Melting point: 130° C.

Analysis: $C_{15}H_{20}ClN_5O$ (321.81). Calculated: C, 55.98; H, 6.26; N, 21.76. Found: C, 53.60; H, 6.40; N, 21.31.

Example 12 (Compound No. 117)

10.45 g (0.05 mol) of 2,4-dichloro-6[hydroxy-2-ethyl)-amino]-triazine-1,3,5 (R. Hinkens, R. Promel and R. H. Martin: Helv. Chim. Acta 44, 299 (1961)) are dissolved in 100 ml of acetone at 0°– 5° C. 10.1 g (11.1 ml) of N-methylmorpholine, dissolved in 50 ml of acetone, are added dropwise at this temperature. After one hour, the mixture is filtered and the precipitate is washed with acetone. The hygroscopic salt is dissolved, without further drying, in 50 ml of $H_2O$. After 16 hours the aqueous solution is filtered and evaporated to dryness. The residue is twice extracted with hot acetonitrile, filtered off and dried.

4.4 g of the product are dissolved in 10 ml of $H_2O$, the solution is filtered and 30 ml of isopropanol are added. The precipitate is filtered off, washed with isopropanol and dried. 1.4 g of the compound of the formula

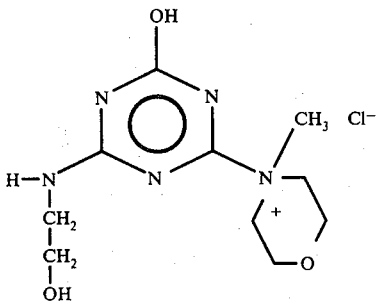
(117)

are obtained.

Melting point: 165° C.

Analysis (the product crystallises with half a mol of water of crystallisation): $C_{10}H_{19}N_5ClO_{3.5}$ (300.75). Calculated: C, 39.94; H, 6.37; N, 23.39. Found: C, 40.30; H, 6.44; N, 23.58.

Example 13 (Compound No. 118)

19.3 g (0.1 mol) of N-ethylamino-dichloro-triazine are dissolved in 500 ml of $CH_2Cl_2$ at room temperature. 25 ml (0.225 mol) of N-methylmorpholine are added over the course of 15 minutes. After stirring for 60 minutes, 150 ml of water are added, undissolved matter is filtered off and the aqueous phase is separated off and evaporated to dryness after standing for 3 days. The residue is boiled up with 100 ml of acetonitrile and filtered hot. The filter residue is washed with acetonitrile and dissolved in 35 ml of $H_2O$. After addition of 5 g of $NaClO_4$, a precipitate is obtained.

8.5 g of the compound of the formula

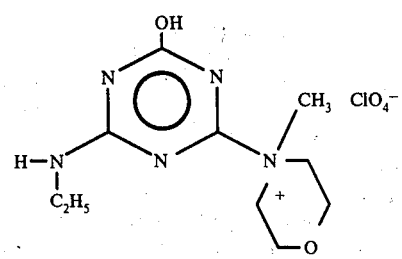

are obtained.

Melting point: 188°–190° C.

Analysis: $C_{10}H_{18}ClN_5O_6$ (339.74). Calculated: C, 35.35; H, 5.34; N, 20.61. Found: C, 35.17; H, 5.23; N, 20.79.

Example 14 (Compound No. 119)

17.9 g (0.1 mol) of N-methylamino-dichlorotriazine are dissolved in 500 ml of $CH_2Cl_2$ at approx. 25° C. 25 ml (0.225 mol) of N-methylmorpholine are added over the course of 15 minutes. After stirring for 90 minutes, 150 ml of water are added, undissolved matter is filtered off and the aqueous phase is separated off and evaporated to dryness after standing for 3 days. The residue is boiled up with 100 ml of acetonitrile and the mixture is filtered hot. The filter residue is washed with acetonitrile and dissolved in 25 ml of $H_2O$. After addition of 3 g of $NaClO_4$, a precipitate is obtained.

2.8 g of the compound of the formula

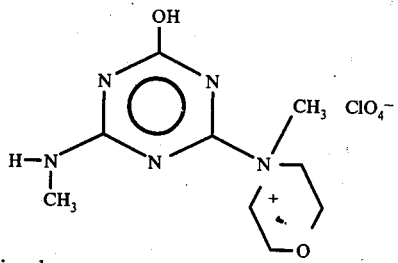

are obtained.

Melting point: 190°–192° C

Analysis: $C_9H_{16}ClN_5O_6$ (325.71). Calculated: C, 33.19; H, 4.95; N, 21.50. Found: C, 33.06; H, 5.08; N, 21.67.

Example 15 (Compound No. 120)

245 ml of N-methylmorpholine are added to a solution of 187 g of dichloro-hydroxy-triazine (as the sodium salt) in 4,400 ml of water at 15°–20° C. 220 g of $NaBF_4$, dissolved in 300 ml of $H_2O$, are added to the filtered solution. The precipitate is filtered off, washed with acetone and dried.

Yield: 280 g.

After recrystallisation from 8,400 ml of water, 200 g of the compound of the formula

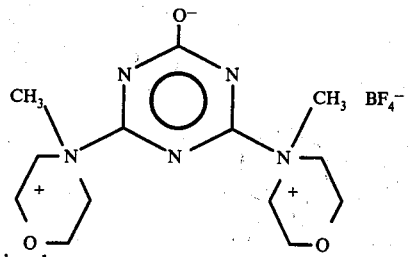

are obtained.

Melting point: 255° C.

Analysis: $C_{13}H_{22}N_5O_3BF_4$ (383.15). Calculated: C, 40.75; H, 5.79; N, 18.28. Found: C, 40.45; H, 5.75; N, 18.23.

The compounds 121 – 130 can be manufactured in accordance with the same instructions by varying the amine and the anion.

Example 16 (Compound 131)

4 g of the compound of the formula (133)

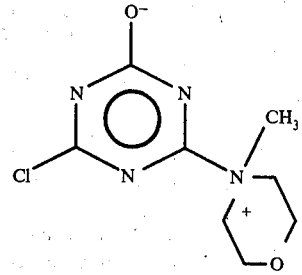

are suspended in 55 ml of $H_2O$. 5 g of $NaClO_4$ are added thereto, followed by 1.7 g of N-methylpiperidine. After 7 hours the precipitate is filtered off and washed with water.

4.8 g of the compound of the formula (131)

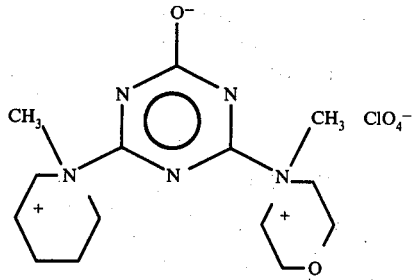

are obtained.

Melting point: 228°–229° C.

Analysis: $C_{14}H_{24}N_5O_6Cl$ (393.83). Calculated: C, 42.70; H, 6.14; N, 17.78. Found: C, 42.51; H, 6.06; N, 17.75.

Example 17 (Compound 132)

14 g (0.082 mol) of the sodium salt of dihydroxychlorotriazine are dissolved in 100 ml of $H_2O$. 10.1 g (0.1 mol) of N-methylmorpholine are added thereto at room temperature. A precipitate forms. This is filtered off, washed with ice water and then with acetone, and dried.

10.6 g of the compound of the formula

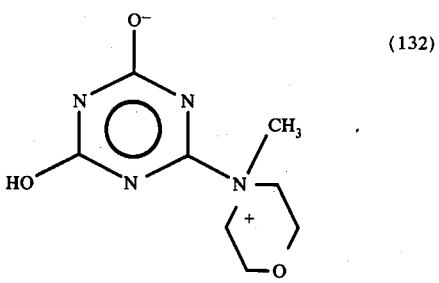

are obtained.

Melting point: 240°–242° C.

Analysis: $C_8H_{12}N_4O_3$ (212.21). Calculated: C, 45.28; H, 5.70; N, 26.41. Found: C, 45.29; H, 5.82; N, 26,30.

Example 18 (Compound 133)

37.6 g (0.2 mol) of the sodium salt of hydroxydichlorotriazine are dissolved in 300 ml of $H_2O$ and 24.2 ml (0.2 mol) of N-methylmorpholine are added. After 30 minutes the precipitate is filtered off, washed with a little water and then with acetone, and dried.

29 g of the compound of the formula

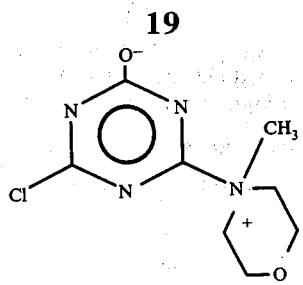

(133)

are obtained.

Melting point: 198° C.

Analysis: $C_8H_{11}N_4O_2Cl$ (230.66). Calculated: C, 41.66; H, 4.81; N, 24.09. Found; C, 40.93; H, 4.74; N, 24.00.

Compound 134 can be obtained in accordance with the same instructions, by varying the amine.

ILLUSTRATIVE EMBODIMENTS

Example 19

In the examples which follow, the reciprocal swelling factor is used as a measure of the hardening. The samples were prepared as follows: 6 ml of a 6% strength gelatine solution, 1 ml of a 1% strength dyestuff solution of the formula

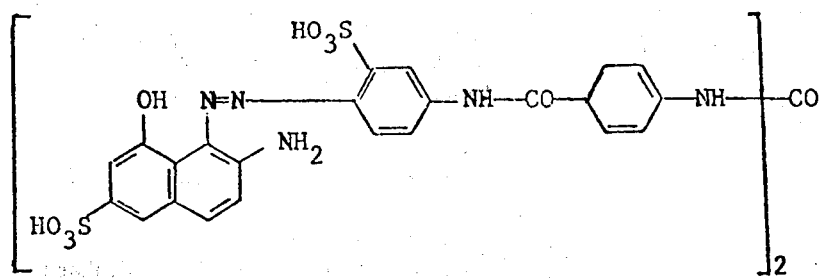

1 ml of a $25.10^{-3}$ molar hardener solution and 5 ml of deionised water are mixed and the pH adjusted to 6.5. The solution is cast on a 13 × 18 cm triacetate film. After solidification at 10° C, the layer is dried over the course of one hour at approx. 20° C. The dyestuff merely serves to make the samples more readily visible during the swelling measurements. Storage takes place under room conditions (NL, approx. 20° C, 50% relative atmospheric humidity) or climatically controlled conditions (CL, 43° C, 69% relative atmospheric humidity).

To determine the reciprocal swelling factor, a thin section of approx. 20 μ is prepared from each of the samples and measured under a microscope. The thickness of the dry gelatine layer is then determined, deionised water is then added and after 4 minutes the thickness of the swollen gelatine layer is measured. The reciprocal swelling factor 1/SF corresponds to the following ratio:

$$1/SF \quad \frac{\text{Thickness of the dry layer}}{\text{Thickness of the swollen layer}}$$

| Crosslinking agent of the formula | No. | A | X⁻ | B | 1/SF on normal storage after | | | 1/SF under climatically controlled storage | |
|---|---|---|---|---|---|---|---|---|---|
| | | | | | 3 hours | 2 days | 7 days | 2 days | 7 days |
| 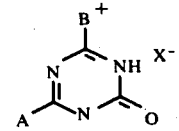 | 101 | —NH₂ | Cl⁻ | 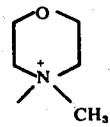 | 0.080 | 0.159 | 0.209 | 0.332 | 0.316 |
| " | 102 | —NH₂ | ClO₄⁻ | " | 0.074 | 0.169 | 0.215 | 0.317 | 0.331 |
| " | 103 | —NH₂ | PF₆⁻ | " | 0.100 | 0.149 | 0.195 | 0.305 | 0.316 |
| " | 104 | —NH₂ | J⁻ | " | 0.098 | 0.149 | 0.200 | 0.302 | 0.339 |
| " | 105 | —NH₂ | AsF₆⁻ | " | 0.087 | 0.149 | 0.191 | 0.320 | 0.320 |
| " | 106 | —NH₂ | BF₄⁻ | " | 0.113 | 0.167 | 0.200 | 0.305 | 0.305 |
| " | 107 | —NH₂ | Cl⁻ | 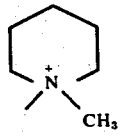 | 0.070 | 0.093 | 0.125 | 0.290 | 0.313 |
| " | 108 | —NH₂ | Cl⁻ | | 0.115 | 0.157 | 0.185 | 0.301 | 0.293 |

| Crosslinking agent of the formula | No. | A | X⁻ | B | 1/SF on normal storage after 3 hours | 2 days | 7 days | 1/SF under climatically controlled storage 2 days | 7 days |
|---|---|---|---|---|---|---|---|---|---|
| '' | 109 | −N(C₂H₅)₂ | ClO₄⁻ | N-methyl piperidinium | — | — | — | 0.216 | 0.271 |
| '' | 110 | N-morpholino | BF₄⁻ | '' | — | — | — | 0.245 | 0.319 |
| '' | 111 | −NH−CH(CH₃)₂ | Cl⁻ | N-methyl morpholinium | 0.101 | 0.128 | 0.168 | 0.328 | 0.319 |
| '' | 112 | furfuryl-CH₂−NH− | Cl⁻ | N-methyl morpholinium | 0.067 | 0.111 | 0.141 | 0.314 | 0.314 |
| '' | 113 | −NH−CH₂−CH=CH₂ | Cl⁻ | N-methyl piperidinium | 0.075 | 0.090 | 0.119 | 0.290 | 0.300 |
| '' | 114 | −NH−C₆H₅ | Cl⁻ | N-methyl morpholinium | 0.070 | 0.096 | 0.122 | 0.350 | 0.348 |
| '' | 115 | −NH−(CH₂)₂−OCH₃ | Cl⁻ | N-methyl morpholinium | 0.082 | 0.117 | 0.153 | 0.320 | 0.319 |
| '' | 116 | −NH−C₆H₅ | Cl⁻ | N-methyl piperidinium | 0.061 | 0.080 | 0.077 | 0.287 | 0.305 |
| '' | 117 | −NH−(CH₂)₂−OH | Cl⁻ | N-methyl morpholinium | 0.094 | 0.132 | 0.175 | 0.309 | 0.324 |
| '' | 118 | −NH−CH₂−CH₃ | ClO₄⁻ | N-methyl morpholinium | 0.087 | 0.139 | 0.175 | 0.320 | 0.354 |
| '' | 119 | −NH−CH₃ | ClO₄⁻ | '' | 0.094 | 0.141 | 0.188 | 0.323 | 0.347 |

-continued

| Crosslinking agent of the formula | No. | A | X⁻ | B | 1/SF on normal storage after | | | 1/SF under climatically controlled storage | |
|---|---|---|---|---|---|---|---|---|---|
| | | | | | 3 hours | 2 days | 7 days | 2 days | 7 days |
| (structure with N=N-N, A⁺, O⁻, X⁻) | 120 | N-methylmorpholinium | BF₄⁻ | N-methylmorpholinium | 0.211 | 0.225 | 0.263 | 0.350 | 0.395 |
| " | 121 | N-methylmorpholinium | ClO₄⁻ | N-methylmorpholinium | 0.189 | 0.250 | 0.268 | 0.350 | 0.395 |
| " | 122 | N,N-dimethylpiperidinium | ClO₄⁻ | N,N-dimethylpiperidinium | 0.057 | 0.065 | 0.087 | 0.185 | 0.248 |
| (triazine structure with B⁺, A⁺, O⁻, X⁻) | 123 | N-methylpiperidinium | BF₄⁻ | N-methylpiperidinium | 0.128 | 0.184 | 0.200 | 0.398 | 0.412 |
| " | 124 | N-methylpiperidinium | ClO₄⁻ | N-methylpiperidinium | 0.110 | 0.220 | 0.217 | 0.388 | 0.399 |
| " | 125 | N-methylpyrrolidinium | PF₆⁻ | N-methylpyrrolidinium | 0.143 | 0.191 | 0.230 | 0.337 | 0.368 |
| " | 126 | (CH₃)₄N⁺ | ClO₄⁻ | (CH₃)₄N⁺ | 0.205 | 0.256 | 0.269 | 0.431 | 0.404 |
| " | 127 | N-methylpyridinium | ClO₄⁻⁻ | N-methylpyridinium | 0.110 | 0.154 | 0.176 | 0.334 | 0.319 |
| " | 128 | quinuclidinium | ClO₄⁻ | quinuclidinium | 0.060 | 0.091 | 0.090 | 0.225 | 0.268 |
| " | 129 | HC≡C-CH₂-N⁺(CH₃)₂ | ClO₄⁻ | HC≡C-CH₂-N⁺(CH₃)₂ | 0.210 | 0.271 | 0.265 | 0.385 | 0.387 |
| " | 130 | N-ethylmorpholinium | BF₄⁻ | N-ethylmorpholinium | 0.085 | 0.103 | 0.117 | 0.313 | 0.319 |

-continued

| Crosslinking agent of the formula | No. | A | X⁻ | B | 1/SF on normal storage after | | | 1/SF under climate- ically con- trolled storage | |
|---|---|---|---|---|---|---|---|---|---|
| | | | | | 3 hours | 2 days | 7 days | 2 days | 7 days |
| " | 131 | morpholinium-N-CH₃ | ClO₄⁻ | N-methylpiperidinium | 0.183 | 0.229 | 0.284 | 0.351 | 0.391 |
| " | 132 | OH— | Cl⁻ | N-methylmorpholinium | 0.071 | 0.086 | 0.117 | 0.290 | 0.323 |
| 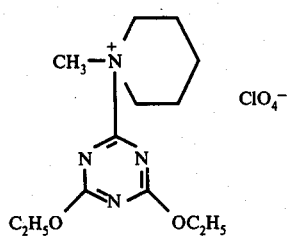 | 133 | Cl— | Cl⁻ | N-methylmorpholinium | 0.111 | 0.176 | 0.185 | 0.310 | 0.313 |
| " | 134 | Cl— | Cl⁻ | N-ethylmorpholinium | 0.074 | 0.102 | 0.122 | 0.160 | 0.189 |

Example 20 a. Viscosity measurements are carried out on 5% strength aqueous gelatine solutions in a capillary viscometer of the Ostwald type at 40° C. The influence of compounds No. 102, 107, 108 and 109 (Table 1) on this gelatine solution is measured. The comparison substance (A) which is used is the crosslinking agent of the formula

[structure: 2,4-diethoxy-6-(N-methyl-N-piperidinyl)-1,3,5-triazine, ClO₄⁻]

10.27 g of deionised gelatine are swollen in 100 ml of distilled water for 30 minutes at room temperature and then stirred for one hour at 50° C. 30 ml of this solution are taken, 0.4 ml of an 8% strength solution of a wetting agent (the sodium salt of an alkylnapthalenesulphonic acid) is added and the ph is adjusted to the desired value of 6.5 by means of the requisite amount of 1 molar sodium hydroxide solution or hydrochloric acid solution.

0.2 mmol of one of the abovementioned crosslinking agents is then dissolved in 10 ml of water and added to the above gelatine solution. The mixture is made up to a total volume of 57.1 ml with distilled water, 20 ml of this solution are withdrawn 5 minutes after the addition of the solution of the crosslinking agent and the viscosity of this solution is followed in a viscometer for 4 hours at 40° C.

The results are summarised in Table 2. They show that in the case of the crosslinking agents according to the invention the viscosity undergoes virtually no change or only an insignificant change. The comparison compound shows a sharp rise in the viscosities and hence an undesired change in the gelatine solution.

b. The viscosity measurement is carried out according to a), under the following conditions and with the following compounds:

| | |
|---|---|
| 10% strength gelatine solution pH value: | 4.5 |
| Temperature: | 40° C |
| Amount of crosslinking agent: | 7 mmols/100 g of gelatine |
| Compound according to the invention | (120) |

Comparison substance (B)

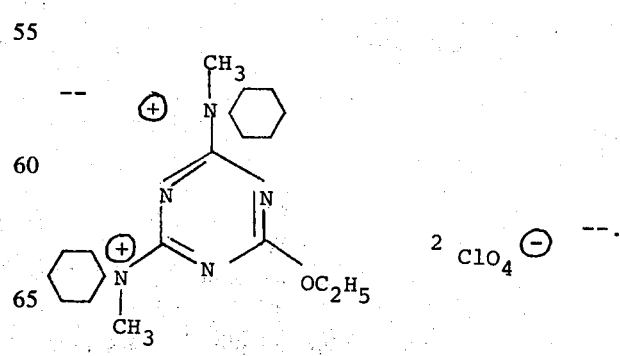

The results are also contained in Table 2. The comparison substance (B) also shows a sharp rise in the viscosities.

TABLE 2

| Compound (No. according to Table 1) | Viscosity (cp) | | | | |
|---|---|---|---|---|---|
| | Time (hours) 0 | 1 | 2 | 3 | 4 |
| 102 | 7.5 | 7.5 | 7.6 | 7.6 | — |
| 107 | 6.7 | 6.6 | 6.7 | 6.7 | — |
| 108 | 6.7 | 6.9 | 7.2 | 7.4 | — |
| 109 | 6.4 | 6.4 | 6.4 | 6.4 | — |
| Comparison substance A | 6.8 | 8.0 | 9.4 | 10.9 | 12.3 |
| 120 | 22.80 | 22.87 | 22.96 | 23.06 | — |
| Comparison substance B | 24.41 | 27.26 | 32.51 | 37.29 | — |

What we claim is:

1. Process for crosslinking hydrophilic colloids which contain amino, imino and/or hydroxyl groups, which comprises using a crosslinking compound of the formula

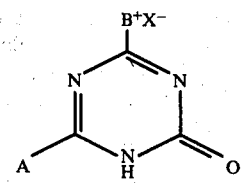

wherein A is hydrogen, hydroxyl, halogen, acylamino, an immoniumether radical, the radical of the formula

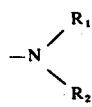

wherein $R_1$ and $R_2$ independently of one another are hydrogen, unsubstituted or substituted alkyl, alkenyl, alkinyl, cycloalkyl with 5 or 6 carbon atoms, aryl or aralkyl or together with the nitrogen atom to which they are bonded form a saturated ring which may contain yet other heteroatoms, or the radical of the formula

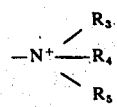

wherein $R_3$, $R_4$ and $R_5$ independently of one another are hydrogen, unsubstituted or substituted alkyl, alkenyl, alkinyl, cycloalkyl, aryl or aralkyl or together with the nitrogen atom to which they are bonded form a saturated or unsaturated ring which may contain yet other hetero-atoms, $b^+$ is an ammonium or phosphonium radical and $X^-$ is an anion.

2. Process according to claim 1, which comprises using a compound, wherein A is hydrogen, hydroxyl, halogen, acylamino, an immonium-ether radical, the radical of the formula

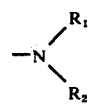

wherein $R_1$ and $R_2$ independently of one another are hydrogen, unsubstitued or substituted alkyl, alkenyl, alkinyl, aryl or aralkyl or together with the nitrogen atom to which they are bonded form a saturated ring which may contain yet further hetero-atoms, or the radical of the formula

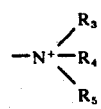

wherein $R_3$, $R_4$ and $R_5$ independently of one another are hydrogen, unsubstituted or substituted alkyl, alkenyl, alkinyl, cycloalkyl, aryl or aralkyl or together with the nitrogen atom to which they are bonded form a saturated or unsaturated ring which may contain yet further hetero-atoms.

3. Process according to claim 2, which comprises using a compound of the formula

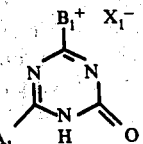

wherein $A_1$ is hydroxyl, halogen, the radical of the formula

wherein $R_6$ and $R_7$ independently of one another are hydrogen and at least one of the substituents $R_6$ and $R_7$ is alkyl, alkenyl, alkinyl, hydroxyalkyl or alkoxyalkyl each with up to 5 carbon atoms, cycloalkyl with 5 or 6 carbon atoms, phenyl, phenyl substituted by hydroxyl, halogen or alkoxy, or furfuryl, or $R_6$ and $R_7$ together with the nitrogen atom to which they are bonded represent a saturated 5-membered or 6-membered ring which optionally contains yet further hetero-atoms, or $A_1$ is the radical of the formula

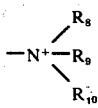

wherein $R_8$, $R_9$ and $R_{10}$ independently of one another are alkyl, alkenyl, alkinyl each with up to 5 carbon atoms or cycloalkyl with 5 or 6 carbon atoms or at least two of the substituents, together with the nitrogen atom to which they are bonded, represent a saturated or unsaturated 5-membered or 6-membered ring which may yet further hetero-atoms, $X_1^-$ is a halogen, nitrate, sulphate, phosphate, carbonate, borate, chlorate, iodate, perchlorate, thiocyanate, methylsulphate, ethylsulphate, acetate, trifluoroacetate, oxalate, tartrate, benzoate, benzenesulphonate, p-toluenesulphonate, tetrafluoroborate, hexafluorophosphate, hexafluorotitanate, hexafluoroantimonate, hexafluoroarsenate, hexachlorostannate, hexachloroantimonate, tetrachloroaurate, tetrachloroaluminate and tetrachloroferrate anion and $B_1^+$ is an ammonium radical containing up to three alkyl, cycloalkyl, alkenyl or alkinyl groups or a monocyclic saturated or unsaturated cycloammonium radical bonded to the s-triazine radical via a quaternary ring nitrogen atom.

4. Process according to claim 3, which comprises using a compound of the formula

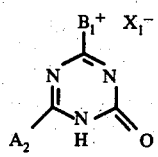

wherein $A_2$ is hydroxyl, halogen, the radical of the formula

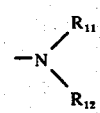

wherein $R_{11}$ and $R_{12}$ independently of one another are hydrogen and at least one of the substituents $R_{11}$ and $R_{12}$ is alkyl, alkenyl, alkinyl, hydroxyalkyl or alkoxyalkyl each with up to 3 carbon atoms, cyclohexyl, phenyl or furfuryl or $R_{11}$ and $R_{12}$ together with the nitrogen atom to which they are bonded represent a saturated 5-membered or 6-membered ring which may contain oxygen or sulphur atoms or further nitrogen atoms, or $A_2$ is the radical of the formula

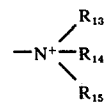

wherein $R_{13}$, $R_{14}$ and $R_{15}$ independently of one another are alkyl, alkenyl, alkinyl each with up to 3 carbon atoms or cyclohexyl or two of the substituents together with the nitrogen atom to which they are bonded represent a saturated or unsaturated 5-membered or 6-membered ring which may contain oxygen or sulphur atoms or further nitrogen atoms and $B_1^+$ and $X_1^-$ have the meaning indicated in claim 3.

5. Process according to claim 4, which comprises using a compound of the formula

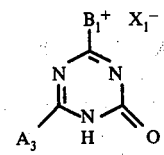

wherein $A_3$ is hydroxy, chlorine, amino, a monosubstituted or disubstituted alkylamino, alkenylamino, hydroxyalkylamino or alkoxyalkylamino radical, each with up to 3 carbon atoms, a morpholino, piperidino, pyrrolidino or furfurylamino radical, a trialkylammonium, dialkylcyclohexylammonium or dialkylpropinylammonium radical with 1 to 3 carbon atoms per alkyl radical, an alkylmorpholinium, alkylpyrrolidinium or alkylpiperidinium radical each with up to 3 carbon atoms in the alkyl radical, the radical

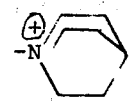

or a pyridinium radical and $B_1^+$ and $X_1^-$ have the meaning indicated in claim 3.

6. Process according to claim 1, which comprises using a compound of the formula

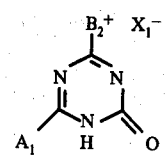

wherein $A_1$ and $X_1^-$ have the meaning indicated in claim 3 and $B_2^+$ is an ammonium radical substituted by up to different alkyl, alkenyl or alkinyl groups each with up to 5 carbon atoms or cycloalkyl groups with 5 or 6 carbon atoms, or an ammonium radical of which the quaternary bonding nitrogen atom, which is substituted by an alkyl radical with 1 to 5 carbon atoms, belongs to a 5-membered or 6-membered monocyclic aliphatic ring which may contain an oxygen or sulphur atom or further nitrogen atoms the radical

or a pyridinium radical.

7. Process according to claim 6, which comprises using a compound of the formula

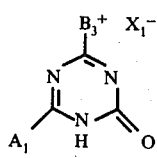

wherein $A_1$ and $X_1^-$ have the meaning indicated in claim 3 and $B_3^+$ is a trialkylammonium, dialkylcyclohexylammonium or dialkylpropinylammonium radical with 1 to 3 carbon atoms per alkyl radical, a morpholinium, pyrrolidinium or piperidinium radical or an alkylmorpholinium, alkylpyrrolidinium or alkylpiperidinium radical with 1 to 3 carbon atoms in the alkyl radical, of which the quaternary bonding nitrogen atom is substituted by an alkyl radical with 1 to 5 carbon atoms the radical

or a pyridinium radical.

8. Process according to claim 1, which comprises using a compound of the formula

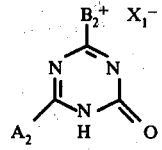

wherein $A_2$, $B_2^+$ and $X_1^-$ have the meaning indicated in claims 3, 4 and 6.

9. Process according to claim 8, which comprises using a compound of the formula

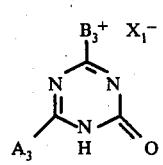

wherein $A_3$, $B_3^+$ and $X_1^-$ have the meaning indicated in claim 3, 5 and 7.

10. Process according to claim 9, which comprises using a compound wherein $A_3$ is $-NH_2$, $-NHCH_3$, $-NH-(CH_2)_2OH$, $(CH_3)_3N^+-$,

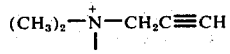

or a 1-methylpyrrolidinium, 1-methyl piperidinium or 1-methylmorpholinium radical.

11. Process according to claim 9, which comprises using a compound wherein $B_3^+$ is a 1-methylpyrrolidinium, 1-methylpiperidinium or 1-methylmorpholinium radical.

12. Process according to claim 9, which comprises using a compound wherein $X_1^-$ is a chloride, iodide, perchlorate, fluoborate, hexafluoarsenate or hexafluophosphate anion.

13. Process according to claim 7, which comprises using a compound of the formula

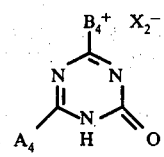

wherein $A_4$ is $NH_2$, methylamino, ethylamino, diethylamino, isopropylamino, hydroxyethylamino, methoxyethylamino, propeneamino, morpholino, anilino, furfurylamino, N-methylmorpholinium, N-ethylmorpholinium, N-methylpiperidinium, N-methylpyrrolidinium, pyridinium, trimethylammonium, dimethylcyclohexylammonium, dimethylpropinylammonium or aza-(2,2,2)-bicyclooctano, $B_4$ is N-methylmorpholinium, N-ethylmorpholinium, N-methylpiperidinium, N-methylpyrrolidinium, pyridinium, trimethylammonium, dimethylcyclohexylammonium, dimethylpropinylammonium or aza-(2,2,2)-bicyclooctano and $X_2$ is a chloride, iodide, perchlorate, fluoroborate, hexafluoroarsenate or hexafluorophosphate anion.

14. Process according to claim 1, which comprises using the compound of the formula

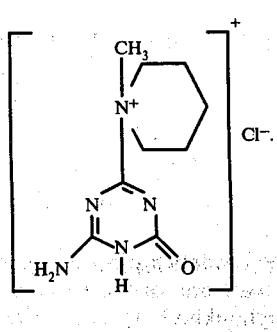

15. Process according to claim 1, which comprises using the compound of the formula

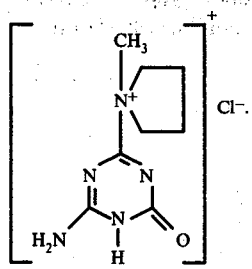

16. Process according to claim 1, characterised in that the compound of the formula

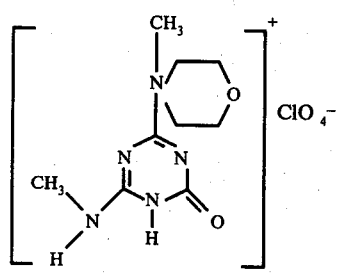

is used.

17. Process according to claim 1, which comprises using the compound of the formula

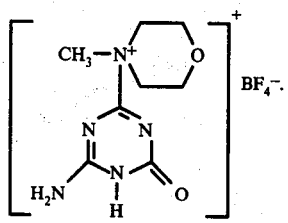

18. Process according to claim 1, which comprises using the compound of the formula

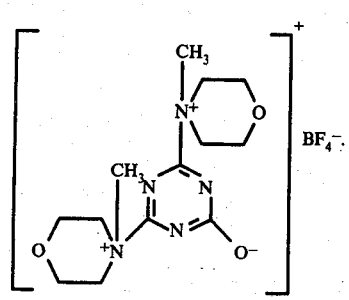

19. Process according to claim 1, which comprises using the compound of the formula

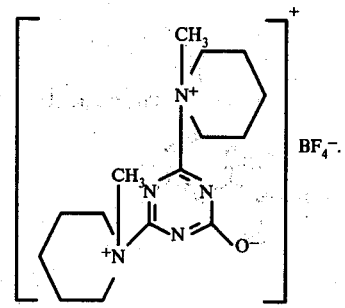

20. Process according to claim 1, which comprises using the compound of the formula

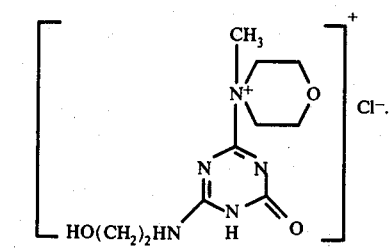

21. Process according to claim 1, which comprises using the compound of the formula

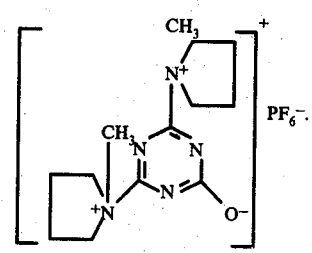

22. Process according to claim 1, which comprises using the compound of the formula

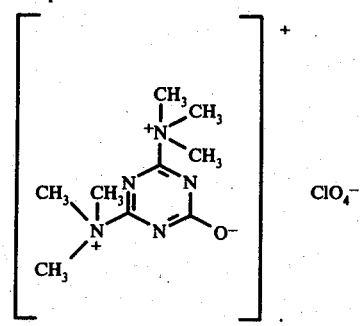

23. Process according to claim 1, which comprises using the compound of the formula
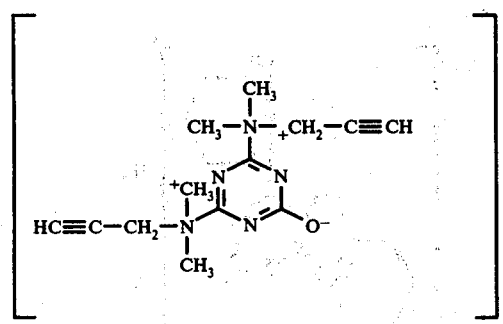
24. Process according to claim 1, wherein polyvinyl alcohol or gelatine are crosslinked.
25. Process according to claim 24, wherein gelatine in layers of a photographic material is crosslinked.
26. The hydrophilic colloids crosslinked according to claim 1.
* * * * *

UNITED STATES PATENT OFFICE
CERTIFICATE OF CORRECTION

PATENT NO. : 3,992,366
DATED : November 16, 1976
INVENTOR(S) : Thomas Stauner et al.

It is certified that error appears in the above-identified patent and that said Letters Patent are hereby corrected as shown below:

Column 33, claim 16, delete "characterised in that" and insert -- which comprises using --;

last line after the structural formula delete "is used".

Signed and Sealed this

Fifteenth Day of February 1977

[SEAL]

Attest:

RUTH C. MASON
*Attesting Officer*

C. MARSHALL DANN
*Commissioner of Patents and Trademarks*